United States Patent
Oriakhi et al.

(10) Patent No.: US 7,641,728 B2
(45) Date of Patent: Jan. 5, 2010

(54) INK COMPOSITION AND METHOD FOR FORMING THE SAME

(75) Inventors: Christopher O. Oriakhi, Corvallis, OR (US); Sukanya Rengaswamy, Corvallis, OR (US); Isaac Farr, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 284 days.

(21) Appl. No.: 11/738,589

(22) Filed: Apr. 23, 2007

(65) Prior Publication Data
US 2008/0257204 A1 Oct. 23, 2008

(51) Int. Cl.
C09D 11/00 (2006.01)
C09D 11/02 (2006.01)
B41J 2/01 (2006.01)

(52) U.S. Cl. .................. 106/31.6; 106/31.9; 106/31.92; 347/100

(58) Field of Classification Search ................. 106/31.6, 106/31.9, 31.86, 31.78, 31.88, 31.92; 347/100
See application file for complete search history.

(56) References Cited

U.S. PATENT DOCUMENTS

| | | | |
|---|---|---|---|
| 4,576,649 A | 3/1986 | Oliver et al. | |
| 4,705,567 A | 11/1987 | Hair et al. | |
| 5,855,862 A * | 1/1999 | Grenier et al. | 423/594.13 |
| 5,908,495 A | 6/1999 | Nohr et al. | |
| 6,077,339 A | 6/2000 | Nyssen et al. | |
| 6,174,360 B1 * | 1/2001 | Sliwinski et al. | 106/453 |
| 6,235,095 B1 | 5/2001 | Nohr et al. | |
| 6,277,183 B1 | 8/2001 | Johnson et al. | |
| 6,281,270 B1 | 8/2001 | Ito et al. | |
| 6,316,142 B1 * | 11/2001 | Delnick et al. | 429/217 |
| 6,551,746 B1 * | 4/2003 | Vitins et al. | 429/231.1 |
| 6,616,744 B1 * | 9/2003 | Sainz et al. | 106/403 |
| 6,663,704 B2 | 12/2003 | Spencer et al. | |
| 6,749,676 B2 | 6/2004 | Spencer et al. | |
| 6,835,238 B1 | 12/2004 | Wu et al. | |
| 6,855,378 B1 * | 2/2005 | Narang | 427/553 |
| 2002/0149656 A1 | 10/2002 | Nohr et al. | |
| 2004/0110865 A1 | 6/2004 | McCovick et al. | |
| 2006/0189113 A1 | 8/2006 | Vanheusden et al. | |
| 2006/0201383 A1 | 9/2006 | Moffatt et al. | |
| 2007/0092432 A1 * | 4/2007 | Prud'Homme et al. | 423/448 |
| 2008/0257211 A1 * | 10/2008 | Oriakhi | 106/31.65 |
| 2008/0259100 A1 * | 10/2008 | Rengaswamy et al. | 347/1 |
| 2008/0259147 A1 * | 10/2008 | Oriakhi et al. | 347/100 |

OTHER PUBLICATIONS

STN abstract of IT 1305992, May 2001.*
Machine translation of JP 10/077427, Mar. 1998.*

* cited by examiner

Primary Examiner—Helene Klemanski

(57) ABSTRACT

An ink composition includes an at least partially intercalated metal oxide colorant and an ink vehicle.

20 Claims, 2 Drawing Sheets

INK COMPOSITION AND METHOD FOR FORMING THE SAME

BACKGROUND

The present disclosure relates generally to ink compositions and to method(s) for forming the same.

Digital printing is a process by which information, in textual and/or graphical form, is transferred from a digital storage device (e.g., a computer), and is established, via a printer, as an image on a print surface. Digital printing may be accomplished using an inkjet printing method, which is a non-impact printing method where droplets of ink are deposited on the print media to form the desired image.

Several inks, including, but not limited to, pigment-based inks and dye-based inks, have been used for digital inkjet printing processes. Metallic inks (e.g., gold, silver, copper, etc.) may be used for producing digital images having a brilliant metallic luster, and for producing elements in electrical and/or optical display applications. The metallic inks, however, may potentially exhibit poor stability and jettability due, at least in part, to relatively large particle size(s) of the metallic luster imparting component, and the tendency of the particles to agglomerate and/or settle.

BRIEF DESCRIPTION OF THE DRAWINGS

Features and advantages of embodiments of the present disclosure will become apparent by reference to the following detailed description and drawings, in which like reference numerals correspond to similar, through not necessarily identical, components. For the sake of brevity, reference numerals or features having a previously described function may not necessarily be described in connection with other drawings in which they appear.

DETAILED DESCRIPTION

Figure 1:
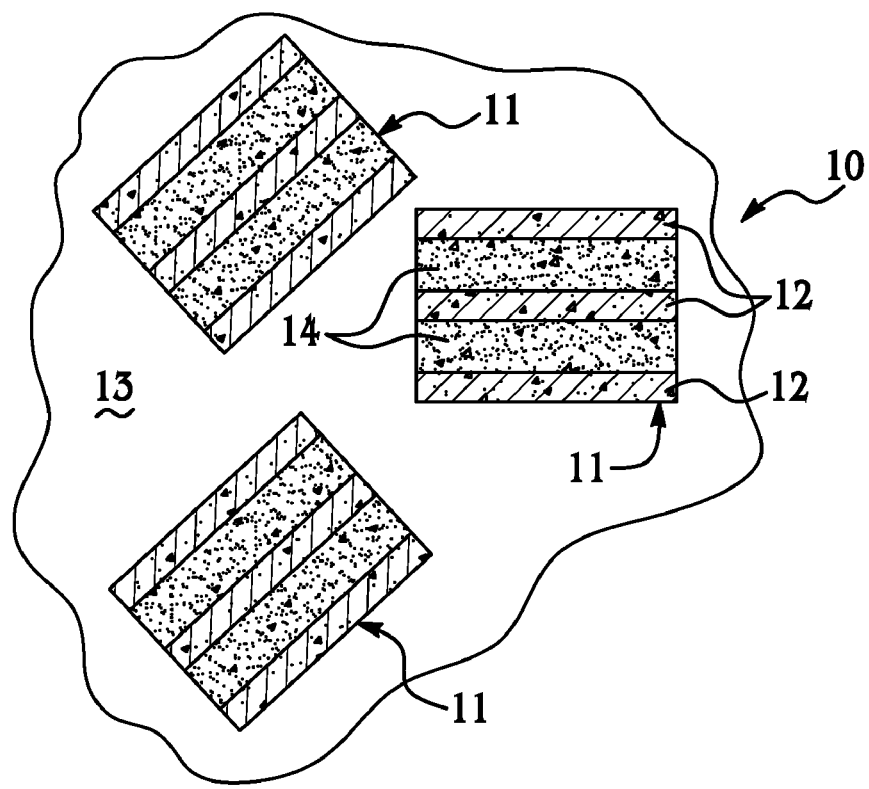
FIG. 1 schematically depicts an embodiment of the ink composition including an embodiment of an intercalated metal oxide.

Embodiments of the ink composition disclosed herein advantageously produce images on a print media having a metallic luster. These inks may be suitable for use in digital inkjet printing. It is believed that the metallic colored inks disclosed herein have good storage stability, are relatively economical for the consumer, produce digital images with desirable levels of metallic luster, and produce elements exhibiting desirable electrical properties. The color of the ink compositions may advantageously be customized, in part, because of the variety of species that may be intercalated with the metal oxides. Embodiments of the ink composition include layered inorganic materials or organic-inorganic hybrid materials as colorants, which are believed to enhance the metallic luster of the inks. Furthermore, the ink composition disclosed herein may advantageously be configured for use in inkjet printing, electrical devices, and/or optical display devices.

As defined herein, the term "luster" refers to the brightness or metallic sheen of a material as seen by the naked eye when light is reflected off the surface of the material. The material exhibits a "metallic luster" when the luster of the material resembles the luster that would normally be exhibited by a metal.

The ink composition as disclosed herein includes an ink vehicle and an intercalated metal oxide colorant. As defined herein, the term "ink vehicle" refers to the combination of water and solvents (and additives, if desired) to form a vehicle in which the intercalated metal oxide is added to form the ink composition. Suitable additives may include, but are not limited to surfactants, polymers, buffers, biocides, sequestering agents, viscosity modifiers, surface-active agents, and/or mixtures thereof. In an embodiment, the ink vehicle for the ink composition includes at least one solvent and water.

One or more solvents for the ink vehicle are selected from, but are not limited to, polyethylene glycol, 2-pyrrolidone, diethylene glycol, glycerol, 2-methyl-1,3-propandiol, N-methyl-2-pyrrolidinone, tetramethylene sulfone, 1,5-pentanediol, 1,2-hexanediol, 3-pyridylcarbinol, tetra(ethylene glycol), 1-butanol, diethylene glycol, isopropyl alcohol, and combinations thereof. In a non-limiting example, the solvent(s) are present in the ink vehicle in an amount ranging from about 10 wt % to about 20 wt %.

One or more surfactant(s) may also be used in the ink composition, for example, to assist in controlling the physical properties of the ink, such as jetting stability, waterproofness and bleeding. In an embodiment, one or more surfactants may be used in the ink composition in an amount ranging from about 0.01 wt % to about 3 wt %.

Suitable surfactant(s) include those that are nonionic or those that are ionic. The nonionic surfactants may be a water-soluble organic ether or alcohol. Several commercially available nonionic surfactants may be used in the formulation of the metallic ink, examples of which include ethoxylated alcohols such as those from the Tergitol® series (e.g., Tergitol® 15S5, Tergitol® 15S7), manufactured by Union Carbide, Houston, Tex.; surfactants from the Surfynol® series (e.g. Surfynol® 440 and Surfynol® 465), manufactured by Air Products and Chemicals, Inc., Allentown, Pa.; fluorinated surfactants, such as those from the Zonyl® family (e.g., Zonyl® FSO and Zonyl® FSN surfactants), manufactured by E.I. duPont de Nemours Company, Wilmington, Del.; fluorinated PolyFox® nonionic surfactants (e.g., PG-154 nonionic surfactants), manufactured by Omnova, Fairlawn, Ohio; 2-diglycol surfactants, such as 1,2 hexanediol or 1,2-octanediol; coco-betaine (e.g., Mackam™ CB-35 manufactured by McIntyre Group Ltd., University Park, Ill.); or combinations thereof.

Suitable non-limiting examples of ionic surfactants include, but are not limited to surfactants of the Dowfax® family (e.g., Dowfax® 8390, Dowfax® 2A1), manufactured by Dow Chemical Company, Midland, Mich.; anionic Zonyl® surfactants (e.g., Zonyl® FSA), manufactured by E.I. duPont de Nemours Company or combinations thereof.

Additives may also be incorporated into any of the embodiments of the ink composition disclosed herein. As used herein, the term "additives" refers to constituents of the ink that operate to enhance performance, environmental effects, aesthetic effects, or other similar properties of the ink. Examples of additives include buffers, biocides, sequestering agents, chelating agents, corrosion inhibitors, or the like, or combinations thereof.

The ink vehicle for the ink composition is aqueous and, therefore, includes a substantial amount of water. Generally, water makes up the balance of the ink composition. In an embodiment, water is present in an amount ranging from about 50 wt % to about 85 wt %.

The intercalated metal oxide acts as the colorant in the ink composition. Very generally, the intercalated metal oxide is formed with thin molecular layers or sheets of negatively-charged metal oxides intercalated with one or more positively-charged or neutrally-charged intercalates.

More specifically, the metal oxides are negatively charged sheets, layers or particles that are capable of stacking or spontaneously becoming ordered in the presence of cations. In some embodiments, cations adsorb on the surface of the negatively charged metal oxides, thereby inducing stacking. In other embodiments, neutral or positively charged polymers are adsorbed on the surface of the negatively charged metal oxides, thereby inducing stacking. In the process, the cation and/or polymer becomes included or intercalated such that alternating layers of metal oxide and cation and/or polymer are formed.

Figure 2:
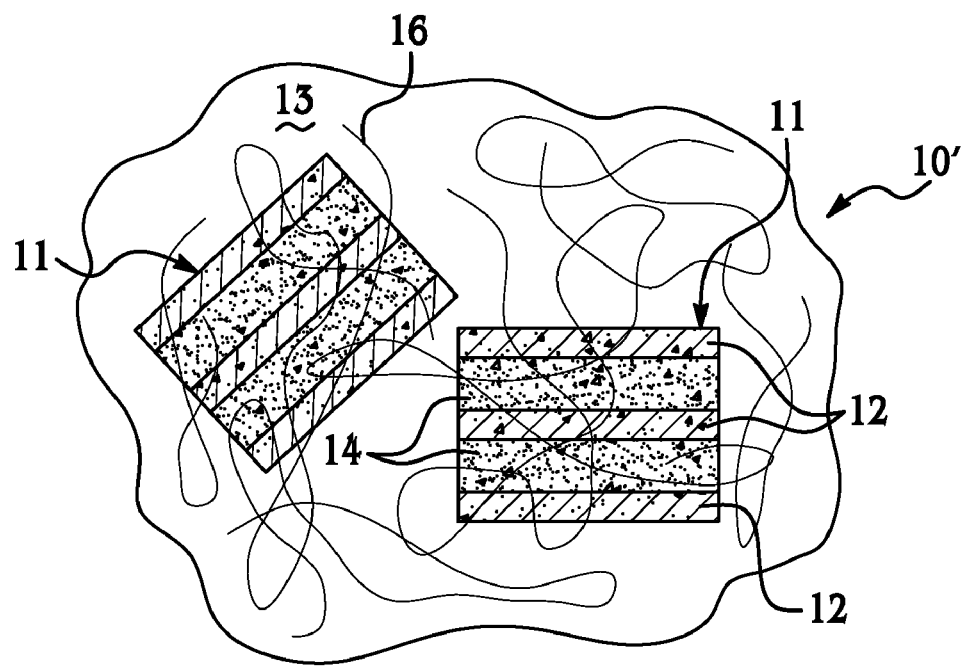
FIG. 2 schematically depicts another embodiment of the ink composition including an embodiment of the intercalated metal oxide.
Figure 3:
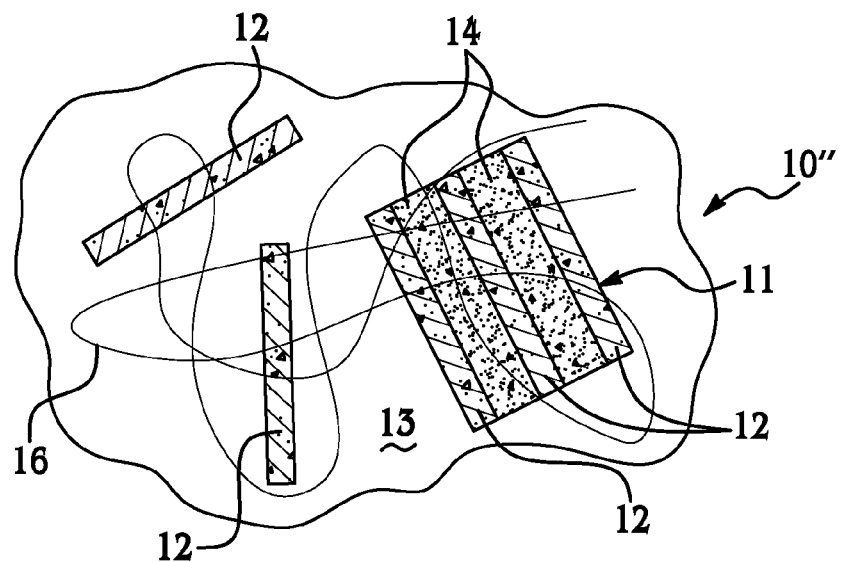
FIG. 3 schematically depicts still another embodiment of the ink composition including an embodiment of the intercalated metal oxide.
Figure 4:
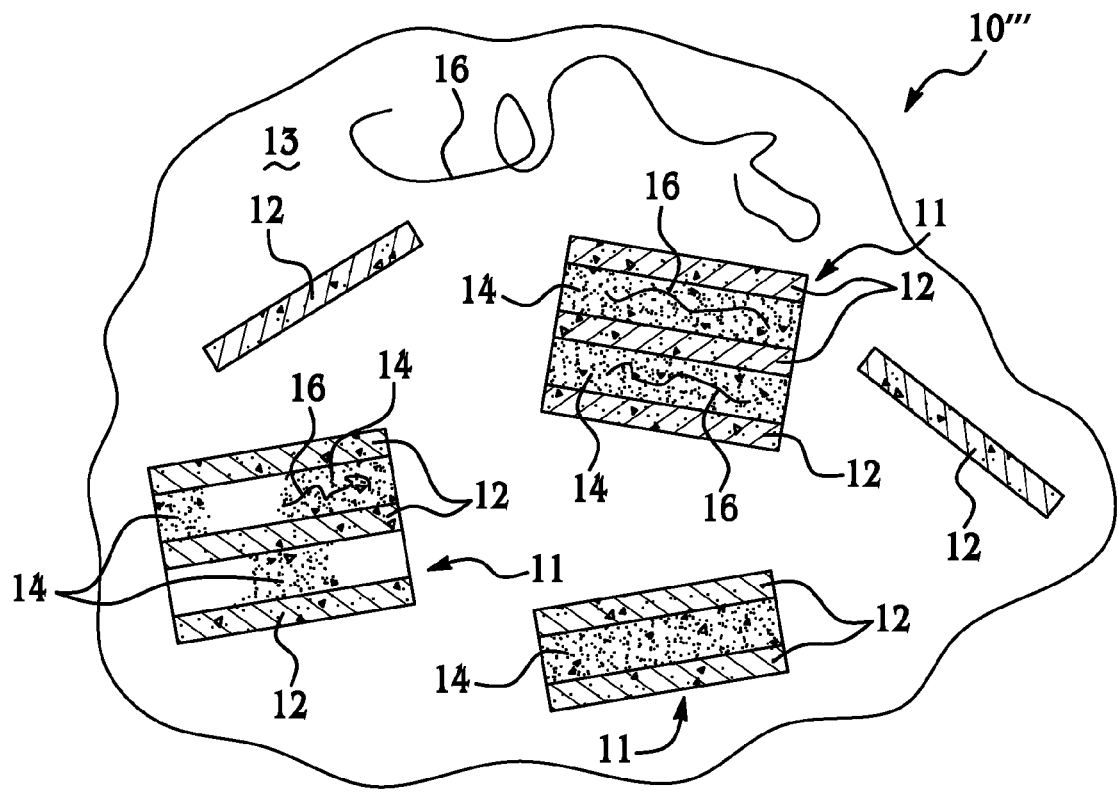
FIG. 4 schematically depicts yet another embodiment of the ink composition including an embodiment of the intercalated metal oxide.

FIGS. 1-4 schematically depict different embodiments of the ink composition 10, 10', 10", 10'" having the intercalated metal oxide colorant 11 dispersed in the ink vehicle 13. Specifically, FIG. 1 depicts an embodiment of the ink composition 10 in which the intercalated metal oxide colorant 11 is a colloid including multiple layers of metal oxide 12 interspersed or intercalated with the intercalate 14. FIG. 2 depicts an embodiment of the ink composition 10' in which the intercalated metal oxide colorant 11 shown in FIG. 1 is present in the ink vehicle with an additional polymeric material 16. FIGS. 3 and 4 depict still other embodiments of the ink composition 10", 10'" in which metal oxide stacked structures are reacted and exfoliated to form metal oxide sheets 12, some of which are intercalated to form the intercalated metal oxide colorant 11. The latter embodiments include a dispersion of organic and/or inorganic material 16, exfoliated metal oxide sheets 12, and intercalated colorant 11 in the ink vehicle 13. As shown in FIG. 4, the intercalated colorant 11 may include the organic and/or inorganic material 16 as the intercalate 14, and may also include areas that are void of intercalate 14.

As previously indicated, the metal oxides 12 are generally in the form of a layered structure that is capable of undergoing an exfoliation reaction (i.e., delamination) which forms single-layered metal oxide colloids and/or bi-layer structures having cations therebetween, which then undergo an intercalation reaction. It is believed that the metal oxide layered structure more readily undergoes exfoliation after it is reacted with alkali metals or alkali metal compounds. As a non-limiting example, a molybdenum trioxide layered structure may be reacted with sodium dithionate and water to introduce sodium cations between the layers (e.g., a first intercalate), and to prepare the layered structure for exfoliation.

It is to be understood that the metal oxides 12 may be intercalated with a wide variety of intercalates 14. It is believed that the interfacial interaction between selected intercalates 14 and the metal oxide 12 is at least partially responsible for the electrical properties (e.g., enhanced conductivity) and/or the optical properties (e.g., metallic luster appearance) of the inks 10, 10', 10", 10'". It is to be understood that by altering the components of the intercalated metal oxide 11 and/or by altering the molar ratio(s) of the components (i.e., intercalated species 14:metal oxide 12), different properties (e.g., luster, photochromic properties, electrochromic properties, color, etc.) of the ink 10, 10', 10", 10'" may be achieved.

In a non-limiting example, molybdenum trioxide intercalated with potassium ions in a 3 to 1 molar ratio tends to exhibit reddish to pinkish bronze color, whereas molybdenum trioxide intercalated with a smaller amount of the potassium ions tends to exhibit a bluish bronze color. In other non-limiting examples, molybdenum trioxide intercalated with phosphate ions exhibits a yellowish green color, whereas molybdenum trioxide intercalated with ethylamine exhibits a brown color. Other suitable colors that may be obtained include yellow (e.g., using bipyridine as the intercalate species), green, khaki, black, pink (e.g., using potassium, sodium or lithium as the intercalate species), or cyan (e.g., using potassium, sodium or lithium as the intercalate species).

Some suitable metal oxides 12 for the ink composition 10, 10', 10", 10'" are polyoxometalates selected from molybdenum oxides, tungsten oxides, vanadium oxides, tantalum oxides, niobium oxides, and combinations thereof. Non-limiting examples of suitable polyoxometalates include $MoO_3$, $WO_3$, $VOPO_4$, $VOSO_4$, $MoOPO_4$, $TaOPO_4$, $VOMoO_4$, $V_2O_5$, $NbOPO_4$, and $VOAsO_4$.

It is to be understood that the metal oxide layers 12 may be entirely intercalated with the intercalate species 14, or at least partially intercalated with the intercalate species 14.

In an embodiment, suitable intercalate species 14 (also referred to herein as "intercalate") for the intercalated metal oxide 11 include cations and/or organic materials. The inks 10, 10', 10", 10'" may be produced from the intercalation of the metal oxide layers 12 with one intercalate species 14 or a combination of intercalate species 14.

In one embodiment, the metal oxide 12 is intercalated with one or more cations. Non-limiting examples of suitable cations include hydrogen cations, lithium cations, sodium cations, potassium cations, rubidium cations, cesium cations, thallium cations, gold cations, silver cations, ammonium cations, alkyl ammonium cations, various organic cations (e.g., pyridinium cations and phosphonium cations), and combinations thereof.

In another embodiment, the metal oxide 12 is intercalated with an organic material. Non-limiting examples of suitable organic materials include cationic polymers or copolymers, nonionic polymers or copolymers, dyes, amines, pyridines, anilines, alkyl ammoniums, bipyridines, triazoles, and combinations thereof. Non-limiting examples of suitable cationic polymers or copolymers and nonionic polymers or copolymers include polyvinyl alcohols, polyethylene glycols, polyethylene oxides, polyether imides, polyanilines, polyvinyl pyrrolidones, polyethylenimines, polyallyl amines, polyanisidines, polythiophene, polyvinyl acetate, substituted analogs or copolymers, and combinations thereof.

In still another embodiment, the metal oxide 12 is intercalated with both a cation and an organic material. Any of the cations and organic materials listed herein is suitable for use in this embodiment.

As previously stated, the intercalate species 14 used depends, at least in part, on the desirable color of the ink 10, 10', 10", 10'" and the desirable color of the printed image. Also as previously stated, the intercalate species 14 may be selected to alter an electrochromic property of the ink 10, 10', 10", 10'", a photochromic property of the ink 10, 10', 10", 10'", or a combination thereof. As non-limiting examples, the intercalate species 14 may be selected to produce an intercalated metal oxide 11 having a light blue color that exhibits a dark blue color when exposed to a current, and/or the intercalate species 14 may be selected to produce an intercalated metal oxide 11 having a pink color that exhibits a red color when exposed to light.

The intercalated metal oxide 11 may be formed using several different methods. In an embodiment, the intercalated metal oxide 11 is formed via a material-exchange or substitution process. Such a method may be used to alter the photochromic or electrochromic properties of the ink 10, 10', 10",

10'''. Generally, the method includes providing or forming a metal oxide 12 at least partially intercalated with a first intercalate (not shown), and substituting all or a portion of the first intercalate with a second intercalate 14. Providing involves using a pre-intercalated metal oxide that may, for example, be commercially available. Forming involves intercalating the first intercalate into the metal oxide.

The first intercalate includes a cation, non-limiting examples of which include hydrogen cations, lithium cations, sodium cations, potassium cations, rubidium cations, cesium cations, thallium cations, tin cations, chromium cations, manganese cations, copper cations, and combinations thereof.

The second intercalate 14 is selected from the cations disclosed hereinabove (e.g., hydrogen cations, lithium cations, sodium cations, potassium cations, rubidium cations, cesium cations, thallium cations, tin cations, chromium cations, manganese cations, copper cations, ammonium cations, alkyl ammonium cations, various organic cations (e.g., pyridinium cations and phosphonium cations), or combinations thereof), the organic materials disclosed herein, or combinations thereof.

A substitution reaction is initiated that replaces the first intercalate with the second intercalate. Non-limiting examples of substitution reactions include ion exchange reactions or topotactic reactions.

In one embodiment of the method involving intercalate substitution, a first intercalated cation is substituted with a second cation. This second cation intercalated metal oxide may be added (or have added thereto) protic or aprotic polar solvent(s), thereby forming a colloidal dispersion (a non-limiting example of which is shown in FIG. 1). Non-limiting examples of polar solvents include water, 2-pyrrolidinone, N-methylpyrrolidinone, dimethyl formamide, N-methyl formamide, tetrahydrofuran (THF), dimethyl sulfoxide (DMSO), dimethyl acetamide (DMAc), other suitable polar protic or aprotic solvents, and/or like, and/or combinations thereof.

In another embodiment, an organic and/or inorganic material(s) (e.g., reference numeral 16) is then added to the previously described colloidal dispersion (a non-limiting example of which is shown in FIG. 2). This embodiment of the intercalated metal oxide 11 is added to the ink vehicle 13 in the form of the colloidal dispersion having the organic and/or inorganic material(s) 16 therein.

Non-limiting examples of such organic and/or inorganic material(s) 16 include conductive polymers, semi-conductive polymers, conductive epoxides, dielectric materials, resistor materials, metal particles, metal nanoparticles, solders, ferrite materials, and/or combinations thereof. It is to be understood that the organic and/or inorganic material 16 is selected to alter or introduce an electrical property to the ink composition 10, 10', 10", 10'''. Such inks 10, 10', 10", 10''' may be used to form electrical elements exhibiting, for example, desirable levels of conductivity, insulating properties, or the like.

In still another embodiment of the method, intercalation, exfoliation and reconstruction are used to form the intercalated metal oxide 11 (non-limiting examples of which are shown in FIGS. 3 and 4). An alkali metal intercalated metal oxide host (generally having a negatively charged layered structure) is exfoliated to form a dispersion. As previously described, a metal oxide host may be treated with alkali metals or alkali metal compounds to form the alkali metal intercalated metal oxide host. It is believed that the alkali metal intercalated metal oxide host may more readily exfoliate. As a non-limiting example, the metal oxide host may be reacted with $Na_2S_2O_4$ and water to introduce sodium cations into the host. Other examples of suitable reactants include organolithium compounds, lithium borohydrides, sodium borohydrides, and/or combinations thereof. The intercalated host is then exfoliated to form a dispersion of single-layered negatively charged metal oxide colloids 12 and bi-layer metal oxide structures having the first intercalate therebetween. Exfoliation may be accomplished via a tailored chemical reaction, mechanical stress, ultrasonication, or combinations thereof.

The dispersion (resulting from the exfoliation) is exposed to a cationic intercalate 14 (e.g., cations, cationic/neutral organic materials 16 (e.g., polymers, dyes, etc.), or combinations of cations and organic materials), which induces at least some of the colloids 12 and bi-layers to reconstruct into a layered structure having the intercalate 14 sequestered between single-layered metal oxide colloids 12. In an embodiment, at least some of the colloid sheets 12 are at least partially intercalated, while some other of the colloid sheets 12 and bi-layers remain exfoliated (as shown in FIGS. 3 and 4). As shown in FIG. 3, the material 16 is dispersed within the ink vehicle 13, and as shown in FIG. 4, at least some of the material 16 is intercalated in the colorant 11.

It is to be understood that in any of the embodiments disclosed herein, some of the vehicle components may co-intercalate with water and some alkali metal ions.

Furthermore, the amount of intercalate 14 depends, at least in part, on the amount of individual reactants used. In some embodiments, the second intercalate 14 (e.g., cations, organic material, and/or combinations thereof) may not completely replace the first intercalate, such that the first intercalate and the second intercalate 14 may be present in the colorant 11.

Any of the intercalated metal oxides 11 disclosed herein, regardless of the method used to form them, may be incorporated into the ink vehicle 13 previously described to form an embodiment of the ink composition 10, 10', 10", 10'''.

In an embodiment of the method for forming an image or element on a substrate, the ink composition 10, 10', 10", 10''' disclosed herein is established on at least a portion of the substrate. Establishing the ink 10, 10', 10", 10''' may be accomplished via inkjet printing or ultrasonic spraying. As used herein, the term "inkjet printing" refers to non-impact methods for producing images or elements by the deposition of ink droplets in a pixel-by-pixel manner onto an image-recording medium in response to appropriate commands, such as digital signals. Non-limiting examples of suitable inkjet printing processes include thermal inkjet printing, piezoelectric inkjet printing, or continuous inkjet printing. Suitable printers include portable thermal or piezoelectric inkjet printers (e.g., handheld printers, arm mountable printers, wrist mountable printers, etc.), desktop thermal, piezoelectric or continuous inkjet printers, or combinations thereof.

The amount of the ink composition 10, 10', 10", 10''' established depends, at least in part, on the desirable image and/or element (e.g., an electrical element for use in an electronic or display device) to be formed. The image or element may include alphanumeric indicia, graphical indicia, or combinations thereof. Suitable substrates for use in forming an image include print media, non-limiting examples of which include, but are not limited to, plain papers, porous papers, coated papers, glossy photopapers, semi-gloss photopapers, heavy weight matte papers, billboard papers, vinyl papers, nonporous papers, high gloss polymeric films, transparencies, thermally stable polymeric films, transparent conductive materials, and the like. Suitable substrates for use in forming the element include glass, high gloss polymeric films, thermally stable polymeric films, transparent conductive materials, and the like.

As alluded to hereinabove, the intercalated metal oxide 11 may be used to form elements for molecular electronic applications (such as, for example, electrically conductive traces, ionically conductive traces, solid state electrolytes, and switchable light windows), energy storage devices, optical display panels and screens, and/or other like applications/devices. It is believed that the intercalated metal oxides 11 may also be useful for catalysis, due, at least in part, to the ability to form an intercalated metal oxide 11 that exhibits desirable and/or enhanced electrical and optical properties. The range of photochromic and electrochromic properties, and the relatively high active surface areas of the inks 10, 10', 10", 10''' enable them for use in a variety of applications.

Forming such an element may be accomplished by inkjet printing or ultrasonic spraying (as previously described) an embodiment of the ink 10, 10', 10", 10''' disclosed herein having desirable electrical or optical properties on a desirable substrate.

To further illustrate the embodiment(s) of the present disclosure, the following examples are given herein. It is to be understood that these examples are provided for illustrative purposes and are not to be construed as limiting the scope of the disclosed embodiment(s).

Example 1

A multi-step synthetic procedure was followed to produce a metallic inkjet ink including a colorant having molybdenum oxide intercalated with a lithium cation, which produced printed images with a deep blue color having a metallic luster. According to an embodiment of the method disclosed herein, several stacks of $MoO_3$ layers were first intercalated with sodium cations by reacting sodium dithionite with molybdenum trioxide in the presence of water to produce negatively-charged molybdenum trioxide layers intercalated with sodium cations:

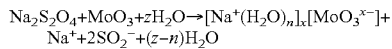

$$Na_2S_2O_4 + MoO_3 + zH_2O \rightarrow [Na^+(H_2O)_n]_x[MoO_3^{x-}] + Na^+ + 2SO_2^- + (z-n)H_2O$$

Some of the sodium cation intercalated molybdenum trioxide was included in an ink vehicle described hereinbelow and tested. The remainder of the sodium cation intercalate of the intercalated molybdenum trioxide was then substituted via ion-exchange with lithium cations:

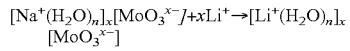

$$[Na^+(H_2O)_n]_x[MoO_3^{x-}] + xLi^+ \rightarrow [Li^+(H_2O)_n]_x[MoO_3^{x-}]$$

Product was collected and dried in air. In addition to air, the product may also be dried, for example, in an oven, or under a vacuum. About 0.6 g of the product was sonicated in about 7 ml water to form a colloidal dispersion of $Li_xMoO_3$.

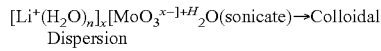

$$[Li^+(H_2O)_n]_x[MoO_3^{x-1+H}{}_2O(sonicate) \rightarrow Colloidal\ Dispersion$$

About 0.45 g polyethylene glycol (PEG) was added to about 7 ml water and stirred so that the polymer was dissolved in the water. The $Li_xMoO_3$ colloidal dispersion was then added to the polymer solution and stirred.

An ink vehicle was formed by adding about 1.5 g (5 wt %) of diethylene glycol, about 1.8 g (6 wt %) of 2-pyrrolidone, about 0.9 g (3 wt %) of isopropyl alcohol, and about 0.06 g (0.2 wt %) of Surfynol® 465 to about 16 ml of water. The colloidal dispersion/polymer solution mixture was added to the ink vehicle and mixed thoroughly and sonicated.

The resultant ink including the intercalated metal oxide based on molybdenum trioxide and lithium exhibited a deep blue color. Other colored inks such as, for example, a yellow ink, a green ink, a brown ink, a khaki ink, a magenta ink, and a black ink, may also be formulated using this procedure by simply altering the embodiments of the intercalated metal oxides (e.g., altering the intercalated species and/or the metal oxide) as disclosed herein.

Example 2

A similar procedure to that provided in Example 1 was used to produce molybdenum trioxide intercalated with ammonium cations, hydrogen cations, or potassium cations instead of lithium cations. The substitution reaction was accomplished via ion exchange.

Physical properties, including the pH, the conductivity, the surface tension, the viscosity and the particle size, were measured for some of the inks (i.e., the ink including the $Na_x$-$MoO_3$ and $Li_xMoO_3$ intercalates formed in Example 1, and the ink including $K_xMoO_3$ formed in Example 2). The inks were filtered through a 0.8 micron filter, and the particle size measurement was taken on a Nanotrac instrument. Any suitable instrument may be used for measuring particle size, including, for example a Nicomp particle sizer.

The results are summarized in Table 1.

TABLE 1

Physical Properties of the Intercalated Metal Oxides $Li_xMoO_3$, $Na_xMoO_3$, and $K_xMoO_3$

|  | pH | Conductivity | Surface Tension | Viscosity | Particle Size nanotrac (nm) |
|---|---|---|---|---|---|
| $Li_xMoO_3$ | 2.53 | 1.94 | 33.6 | 1.92 | 124.6 |
| $Na_xMoO_3$ | 4.13 | 510 | 37.1 | 1.11 | 90.8 |
| $K_xMoO_3$ | 2.82 | 1727 | 36.3 | 1.17 | 312.4 |

As shown in Table 1, the physical properties of intercalated molybdenum trioxide may be altered based on the selected intercalate species. For example, the conductivity and the particle size(s) were substantially increased by using the potassium ions instead of the sodium ions, whereas the pH and the surface tension were increased by using the sodium ions instead of either of the lithium ions or the potassium ions. The viscosity of the ink was substantially increased by using lithium ions instead of sodium ions or potassium ions.

Example 3

The three inks (including $Li_xMoO_3$, $Na_xMoO_3$, and $K_xMoO_3$) formulated in Example 1 and Example 2 were each placed in a HP 56 ink cartridge and printed using an Hewlett Packard (HP) DeskJet 5550 inkjet printer to test their viability and usefulness. The reliability of the cartridge was evaluated from the print samples. All nozzles were healthy, and firing was accomplished with no evidence of clogging. The image quality was visually observed. Waterfastness of printed samples was measured using ISO/DIS 18935:2004 (E). The waterfastness was scored on a scale of 0 to 6, where a score of 2 or lower indicates poor water resistance, a score of 3 to 4 indicates that the ink is fairy water resistant, and a score of 5 to 6 indicates good water resistance. All of the inks tested scored from 3 to 4, suggesting that they are fairly water resistant.

Example 4

The $Li_xMoO_3$, $Na_xMoO_3$, and $K_xMoO_3$ intercalated metal oxide materials formed in Examples 1 and 2 were placed on separate glass slides at various temperatures to determine their individual conductivities as a function of thermal exposure. A 2-point test configuration was used to measure the conductance. The results are summarized in the Table 2:

TABLE 2

Conductivity Measurements for $Na_xMoO_3$, $Li_xMoO_3$, and $K_xMoO_3$ at Varying Probe Spacings

|  | Ohms | Probe Spacing (mm) |
|---|---|---|
| $Na_xMoO_3$ | 158 | 1 |
| $Na_xMoO_3$ | 186 | 2 |
| $Na_xMoO_3$ | 206 | 3 |
| $Na_xMoO_3$ | 218 | 4 |
| $Li_xMoO_3$ | 526 | 1 |
| $Li_xMoO_3$ | 670 | 2 |
| $Li_xMoO_3$ | 832 | 3 |
| $Li_xMoO_3$ | 923 | 4 |
| $K_xMoO_3$ | 10,100 | 4 |

As shown in Table 2, each of the intercalated metal oxides exhibited conductivity. The conductivities of each intercalated molybdenum trioxide were substantially increased by increases in probe spacing.

While several embodiments have been described in detail, it will be apparent to those skilled in the art that the disclosed embodiments may be modified. Therefore, the foregoing description is to be considered exemplary rather than limiting.

What is claimed is:

1. An ink composition, comprising:
   an ink vehicle; and
   an at least partially intercalated metal oxide colorant, a metal oxide of the at least partially intercalated metal oxide colorant being at least partially intercalated with a cation and an organic material.

2. The ink composition as defined in claim 1 wherein the metal oxide of the at least partially intercalated metal oxide colorant is a polyoxometalate selected from the group consisting of molybdenum oxides, tungsten oxides, vanadium oxides, tantalum oxides, niobium oxides, and combinations thereof.

3. The ink composition as defined in claim 1 wherein the cation is selected from the group consisting of hydrogen cations, lithium cations, sodium cations, potassium cations, rubidium cations, cesium cations, thallium cations, gold cations, silver cations, ammonium cations, alkyl ammonium cations, organic cations, and combinations thereof.

4. The ink composition as defined in claim 3 wherein the organic material is selected from the group consisting of cationic polymers or copolymers, nonionic polymers or copolymers, dyes, amines, pyridines, anilines, alkyl ammoniums, bipyridines, triazoles, and combinations thereof.

5. The ink composition as defined in claim 4 wherein the cationic polymers or copolymers or the nonionic polymers or copolymers are selected from the group consisting of polyvinyl alcohols, polyethylene glycols, polyethylene oxides, polyether imides, polyanilines, polyvinyl pyrrolidones, polyethylenimines, polyallyl amines, polyanisidines, polythiophene, polyvinyl acetate, substituted analogs or copolymers, and combinations thereof.

6. The ink composition as defined in claim 1 wherein the organic material is selected from the group consisting of cationic polymers or copolymers, nonionic polymers or copolymers, dyes, amines, pyridines, anilines, alkyl ammoniums, bipyridines, triazoles, and combinations thereof.

7. The ink composition as defined in claim 6 wherein the cationic polymers or copolymers or the nonionic polymers or copolymers are selected from the group consisting of polyvinyl alcohols, polyethylene glycols, polyethylene oxides, polyether imides, polyanilines, polyvinyl pyrrolidones, polyethylenimines, polyallyl amines, polyanisidines, polythiophene, polyvinyl acetate, substituted analogs or copolymers, and combinations thereof.

8. The ink composition as defined in claim 1 wherein the ink vehicle includes:
   at least one solvent; and
   water.

9. The ink composition as defined in claim 8 wherein the at least one solvent is selected from the group consisting of polyethylene glycol, 2-pyrrolidone, glycerol, 2-methyl-1,3-propanediol, N-methyl-2-pyrrolidinone, tetramethylene sulfone, 1,5-pentanediol, 1,2-hexanediol, 3-pyridylcarbinol, tetra(ethylene glycol), 1-butanol, diethylene glycol, isopropyl alcohol, and combinations thereof.

10. The ink composition as defined in claim 1 wherein the ink composition is configured for use in inkjet printing, electrical devices, optical display devices, and combinations thereof.

11. A method of forming an inkjet ink, comprising:
   forming an at least partially intercalated metal oxide colorant, a metal oxide of the at least partially intercalated metal oxide colorant being at least partially intercalated with a cation and an organic material; and
   adding the at least partially intercalated metal oxide colorant to an ink vehicle.

12. The method as defined in claim 11 wherein forming the at least partially intercalated metal oxide colorant is accomplished by:
   providing the metal oxide at least partially intercalated with a first intercalate; and
   substituting all or a portion of the first intercalate with a second intercalate.

13. The method as defined in claim 12 wherein the first intercalate is a cation, and the second intercalate is the cation and the organic material.

14. The method as defined in claim 12, further comprising selecting the second intercalate to alter at least one of an electrochromic property of the ink composition, a photochromic property of the ink composition, or combinations thereof.

15. The method as defined in claim 11 wherein forming the at least partially intercalated metal oxide colorant is accomplished by:
   reacting a metal oxide layered structure, thereby preparing the structure for exfoliation;
   exfoliating the reacted layered structure to form a dispersion of single-layered negatively charged metal oxide colloids and metal oxide bi-layers; and
   intercalating an intercalate material including the cation and the organic material between at least some of the single-layered negatively charged metal oxide colloids, between the metal oxide bi-layers, or combinations thereof.

16. A method of forming an image or an element on a substrate, the method comprising:
   providing an ink composition including:
      an ink vehicle; and
      an at least partially intercalated metal oxide colorant, a metal oxide of the at least partially intercalated metal oxide colorant being at least partially intercalated with a cation and an organic material; and establishing the ink composition on the substrate.

17. The method as defined in claim 16 wherein the image is formed, and wherein the substrate is selected from the group consisting of print mediums including plain papers, porous papers, coated papers, glossy photopapers, semi-gloss photopapers, heavy weight matte papers, billboard papers, vinyl papers, nonporous papers, high gloss polymeric films, transparencies, thermally stable polymeric films, transparent conductive materials, and combinations thereof.

18. The method as defined in claim 16 wherein the element is formed, and wherein the substrate is selected from the group consisting of glass, high gloss polymeric films, thermally stable polymeric films, transparent conductive materials, and combinations thereof.

19. The method as defined in claim 16 wherein at least one of the cation and the organic material is selected to alter at least one of an electrochromic property of the ink, a photochromic property of the ink, or combinations thereof.

20. The method as defined in claim 16 wherein establishing the ink composition on the substrate is accomplished via thermal inkjet printing, piezoelectric inkjet printing, continuous inkjet printing, ultrasonic spraying, and combinations thereof.

* * * * *